No. 687,591. Patented Nov. 26, 1901.
A. F. BARDWELL.
POWER TRANSMITTING MECHANISM.
(Application filed Dec. 19, 1900.)

(No Model.) 3 Sheets—Sheet 1.

WITNESSES:

INVENTOR
Arthur F. Bardwell.
BY
ATTORNEY

No. 687,591. Patented Nov. 26, 1901.
A. F. BARDWELL.
POWER TRANSMITTING MECHANISM.
(Application filed Dec. 19, 1900.)

(No Model.) 3 Sheets—Sheet 3.

WITNESSES:
G. J. Hackley.
Rob't S. Allyn.

INVENTOR
Arthur F. Bardwell.
BY
R. Cunicheel
ATTORNEY

UNITED STATES PATENT OFFICE.

ARTHUR F. BARDWELL, OF MOUNT VERNON, NEW YORK.

POWER-TRANSMITTING MECHANISM.

SPECIFICATION forming part of Letters Patent No. 687,591, dated November 26, 1901.

Application filed December 19, 1900. Serial No. 40,394. (No model.)

*To all whom it may concern:*

Be it known that I, ARTHUR F. BARDWELL, a citizen of the United States, residing at Mount Vernon, county of Westchester, State of New York, have invented certain new and useful Improvements in Power-Transmitting Mechanism, of which the following is a full, clear, and exact description.

My invention relates to power-transmitting devices, particularly of the variable-speed type; and it comprises means whereby a driven shaft may be rotated in either direction at any desired speed, and whereby, if desired, said driven shaft may be allowed to stop or to rotate independently of the driven shaft.

Among the main objects of my invention are simplicity, effectiveness, economy, and wide range of action.

Figure 1:
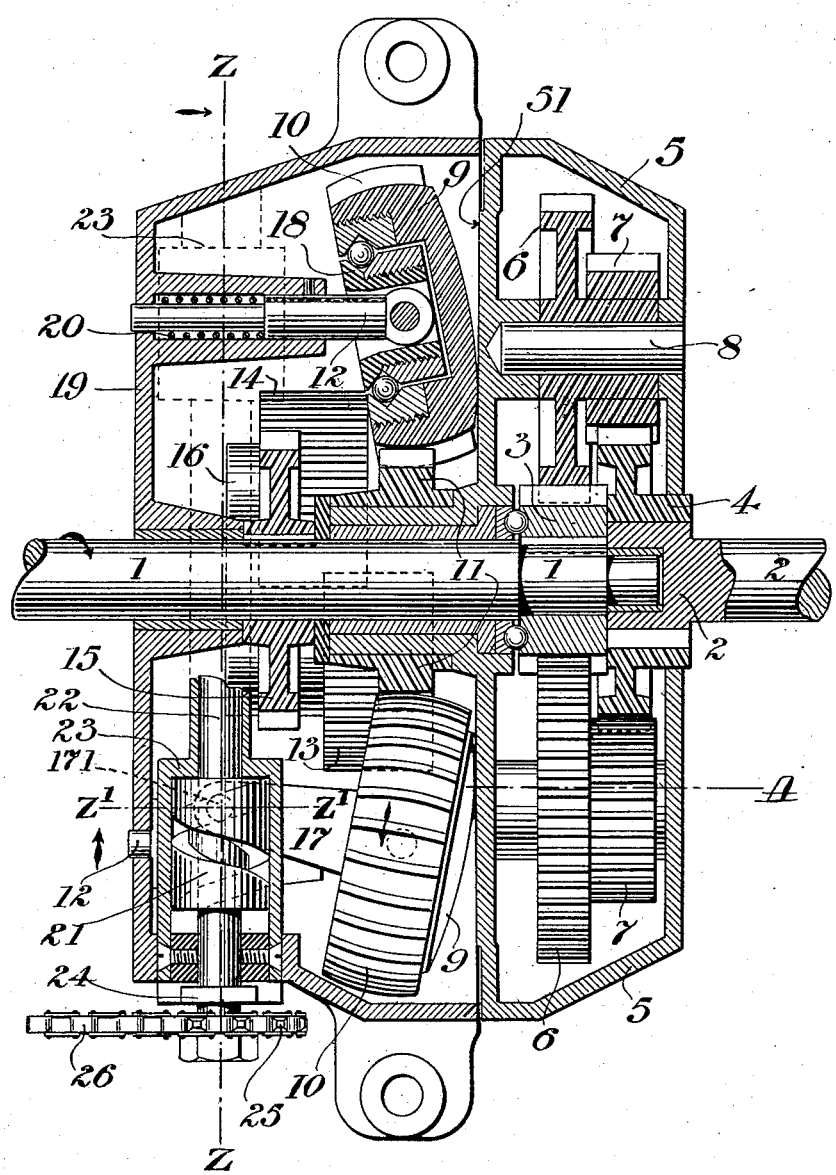
Figure 2:
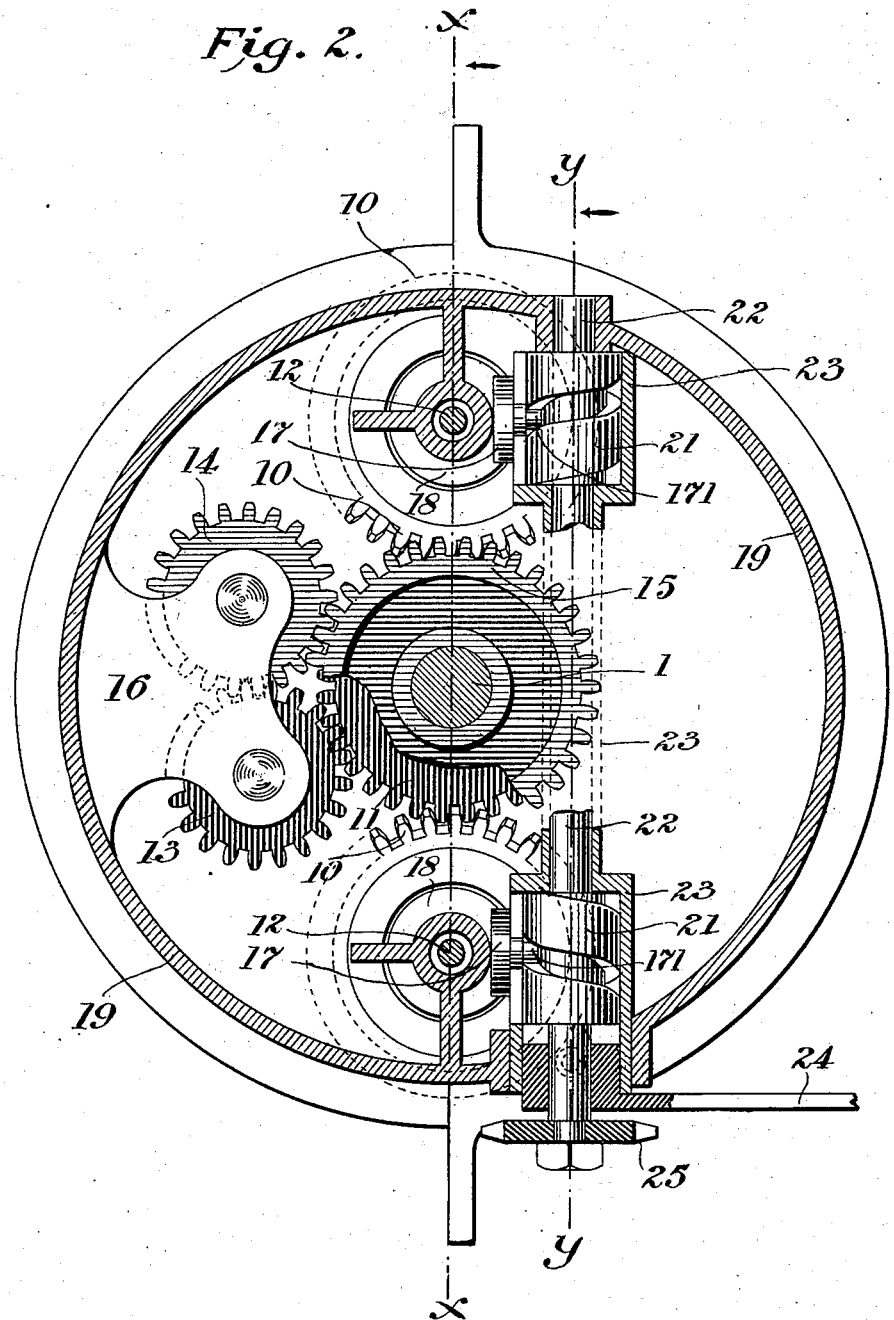
Figure 3:
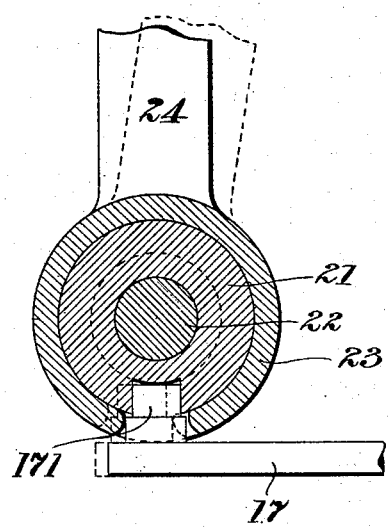
Figure 4:
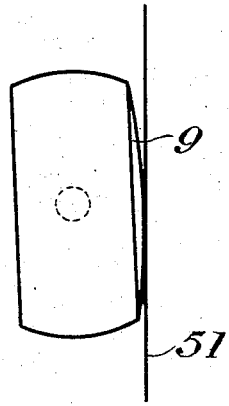
Figure 5:
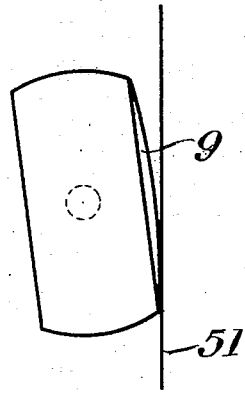

In the accompanying drawings, Figure 1 is a cross-section through the center of my improved power-transmitting device, said section being taken partly on line X X and partly on line Y Y, Fig. 2. Fig. 2 is a section on the plane of the line Z Z, Fig. 1. Fig. 3 is a view of a detail of construction, the same being partly in section on line Z' Z', Fig. 1. Figs. 4 and 5 are diagrams of details, showing different positions.

1 is a driving-shaft, which, it may be assumed, is to be rotated at a constant speed in the direction of the arrow.

2 is the shaft to be driven, hereinafter termed the "driven" shaft. The axes of shafts 1 and 2 are in line.

3 is a gear fixed to shaft 1.

4 is a gear fixed to shaft 2.

5 is a gear-case suitably mounted, so as to revolve concentric with the axes of shafts 1 and 2.

6 is a gear-wheel in mesh with gear 3.

7 is a gear suitably attached to gear 6 and in mesh with gear 4.

The gears 6 and 7 are supported by shaft 8, which in turn is supported by gear-case 5. In the drawings it may be observed that there are two sets of gears 6 and 7. This arrangement is preferred; but it is obvious that a plurality of these sets of gears is not essential. In the event only one set of these gears is employed a counterweight might be used to advantage on the opposite side of the axis of rotation of the case 5, if desired.

9 9 are friction devices, which may have convex bearing-faces at one end. These devices 9 9 may be made of any suitable material and are suitably mounted in bearings which are hinged to supporting members 12 12, so that they may be tilted—for example, as shown in the diagrammatic views, Figs. 4 and 5. The function of the friction devices 9 is to control or check the speed of the gear-case 5, as will be hereinafter explained.

10 10 are gear-teeth around the friction devices 9 9, the form and arrangement of which teeth are such that they will properly mesh with the gear 11 at all operative angles at which the friction devices 9 9 may be tilted. The gear 11 is loosely mounted upon the hub of the gear-case 5.

13 is a gear in mesh with gear 11.

14 is a gear in mesh with gear 13 and also in mesh with gear 15, the latter being fixed upon the driving-shaft 1.

16 is a stationary bearing-support for gears 13 and 14, through which movement is transmitted from gear 15 to gear 11.

At this point it is desirable to describe the operation of the parts thus far referred to. Assume the shaft 2 and gear 4 are at rest, and assume for the present that the friction devices 9 9 are retracted and out of engagement with the gear-case 5. When the driving-shaft 1 is rotated in the direction of the arrow, gear 3 is rotated therewith, which in turn rotates gears 6 and 7, and the gear 7 being in mesh with the then stationary gear 4 will cause the gears 6 and 7 to travel around the axis of the driving-shaft 1, thereby causing the case 5 to travel in a corresponding direction, since said case 5 affords a means of support for the gears 6 and 7. Under these conditions the gear-case 5 rotates in the direction opposite to the direction of rotation of the shaft 1 at a speed dependent upon the ratios of gears 3, 6, 7, and 4. By placing the friction devices 9 9 against gear-case 5—for example, against the bearing face or disk 51 thereof—and revolving the friction devices 9 9 at a speed at which the velocity at the contact-points of 51 and 9 are equal the shaft 2 will still remain at rest. This may be assumed to be the position shown in Fig. 1, the contact-point between the friction devices 9 and the bearing-disk 51 being approximately on the line A, Fig. 1. It will be observed that the friction-disks are revolved at a constant speed relative to the speed of the driving-shaft 1. Assuming that the friction devices 9 9 are tilted so that the points of contact between said devices 9 and the disk 51 are somewhat closer to the axes of the friction devices, then the velocity of the contact-point will be somewhat slower, and consequently said devices 9 9 will act as brakes upon the gear-case 5, causing a lag therein, and consequently power will be transmitted through gears 3, 6, and 7 to gear 4 and cause the forward rotation of the gear 4, whereupon the driven shaft 2 will be rotated in the same direction as the shaft 1. By tilting the friction devices 9 9 until the contact-points between said devices and the bearing-face 51 are coincident with the axes of the devices 9 the gear-case will be slowed down until it is stopped, and then the power of shaft 1 will be transmittted through the gears 3, 6, 7, and 4 to the driven shaft 2, which will then be revolved forwardly in a direction depending upon the ratio of the gears 3, 6, 7, and 4. If instead of allowing the gear-case to revolve backward, as it would under normal conditions, the said gear-case should be driven in a forward direction—that is, in the direction of the driving-shaft 1—then the speed of the driven shaft 2 will be further increased. To accomplish this end, the friction devices 9 may be tilted so that the contact-points between said friction devices 9 and the bearing-disk 51 will be outside of the axes of 9 9 and farther away from the axis of rotation of the case 5. Consequently the case 5 will be driven forwardly by the friction devices 9 9 and a relatively greater speed will be transmitted to the driven shaft 2.

From the foregoing it is apparent that the greatest speed of shaft 2 is attainable under these conditions when the contact-points between the devices 9 and the disk 51 are at the greatest diameter of the said friction devices 9 and as far away from the axis of the bearing-disk 51 as possible. It will also become apparent that by tilting the friction devices 9 the speed of the driven shaft 2 may be varied from the maximum down to zero by simply controlling the speed of the gear-case 5. As before stated, when the driven shaft 2 and the gear 4 are at rest the normal tendency of the case 5 is to revolve backward at a speed depending upon the ratio of the gears 3, 6, 7, and 4. Consequently by increasing the speed of the gear-case 5 above its normal backward speed the gear 4 and driven shaft 2 must necessarily revolve in the reverse or opposite direction to that of the driving-shaft 1. This result is attained by tilting the devices 9 9 until the contact-points between said friction devices 9 9 and bearing-disk 51 are inside of that arc on bearing-disk 51 where the contact velocity of said bearing-points between said parts is equal to the backward speed of the gear-case 5, depending upon the ratio of gears 3, 6, 7, and 4. It being assumed that this arc is coincident with the point indicated by the line A, Fig. 1, obviously if the friction devices 9 are tilted so that the operative contact-points are inside of this line—i. e., nearer the axis of rotation of the case 5—the backward speed of the latter will be built up or added to by the friction devices 9, so that the reverse direction of movement is imparted to the shaft 2. This may be varied more or less by the tilting of the contact devices 9.

I will now proceed to describe the means whereby the friction devices 9 may be engaged with or disengaged from the bearing-disk 51 of the case 5 or may be tilted with respect thereto.

17 17 are arms which project from bearings 18 18 of the friction devices 9 9. These bearings 18 18 are hinged on non-revolving supporting members 12 12, which are slidably mounted in suitable guideways on the fixed case 19. By preference springs 20 20 are employed to normally hold the friction devices 9 9 against the bearing-disk 51 at the end of gear-case 5.

171 171 are shouldered pins projecting laterally from the arms 17 17, which pins are acted upon by cams 21 21, which cams when rotated move or tilt the friction devices 9 9 to the exact position desired. The construction of the cams 21 is such that they will firmly hold the friction devices 9 9 in any desired position.

22 is a shaft carrying cams 21, and by which said cams may be rotated and controlled.

25 is a sprocket-wheel which may be fixed to the shaft 22, and 26 is a chain or belt for rotating said sprocket, and thereby the shaft 22. Obviously any other suitable mechanical controlling means may be substituted in place thereof.

Power-transmitting devices are frequently employed in automobiles, and in automobiles it is often desirable to bring the vehicle to a stop and leave it standing for a time without stopping the motor. Many cases are recorded where runaways have occurred by not providing means which make it impossible for the engine to transmit power to the driven or wheel shaft. I have therefore provided a controlling or locking means whereby the friction devices 9 9 may be retracted from the friction-disk 51 of gear-case 5, so that such accidents are impossible, since when said disks are retracted from said gear-case 5 power of the motor is transmitted only as far as the gear-case. This is merely a supplemental device, since it is not absolutely necessary to disconnect friction devices 9 9 from the gear-case 5, because in the position assumed to be shown in Fig. 1 the driving-shaft 1 is not transmitting power beyond the gear-case 5, the speed of the contact-points of the friction devices 9 and the bearing-disk 51 being the same and the speed of the disk or case 5 being the result of the ratio of the gears 3, 6, 7, and 4. This supplemental controlling means comprises a controlling device 23, which may be tubular in form and may receive its support in any suitable way—for example by the cams 21, the shaft 22, or case 19. The guide-pins 171 project through slots or openings in the controlling device 23, as shown in Fig. 3, so that the shoulders thereon bear in the slot in the controlling device 23. Consequently when said controlling device 23 is rocked or rotated it will, by engagement with the shoulders on pins 171', retract the arms 17, supports 12, and friction devices 9, freeing the same from the gear-case 5 and making it impossible to rotate the driven shaft so long as said devices 9 are held out of engagement with the case.

24 is a lever by which the controller 23 is operated. Any suitable means, such as a latch, (not shown,) may be employed to hold the lever 24 in a position to hold the friction devices 9 in this retracted position.

It will be observed that the gear arrangement throughout is such that it is very seldom that the friction devices 9 are called upon to act otherwise than as brakes to the gear-case 5. It is only when unusual speed in a forward direction or a reverse speed of the driven shaft 2 is desired that the friction devices 9 are called upon to drive or transmit power to the case 5. This is a great advantage in that it adds very materially to the durability of the apparatus. By this mechanism any desired speed may be transmitted to the driven shaft, and the same may be controlled by a single lever, it being merely necessary to revolve the shaft 22, so as to vary the operative position of the friction-disks 9.

Among the very obvious advantages of this construction in connection with automobiles are, that the motor may be started without the necessity of disengaging or disconnecting the power-transmission devices, that the vehicle may be started very gradually and without jar or strain and the speed increased so that it will balance the power of the motor under all road conditions, and does not require any clutches interposed between the motor and the wheels of the vehicle. On the contrary, the speed and direction of the vehicle are always controlled from zero to the maximum, either forwardly or backwardly, by devices constantly in operative engagement, and the same is true when the vehicle is brought to a stop.

For convenience of expression in the claims I will refer to the intermediate gearing between the driving-shaft 1 and the driven shaft 2 as an "epicyclic train," and the gear-case 5, which corresponds to the train-arm of an epicyclic train, will be referred to therein as the "train-case."

In Fig. 2 it will be observed that the gears 10 10 and the bearings 18 and their attached parts have been shown as though the gears were tilted from the position shown in Fig. 1 until their plane is parallel to that of the paper.

A very obvious advantage of my invention in connection with an automobile driven by a hydrocarbon-motor is consequent upon the fact that the best efficiency of such a motor is obtained when running at a speed approximately that of its design. Therefore by interposing this power-transmitting device between the running-shaft or ground-wheel of the vehicle and the motor the latter may be started at a minimum load and run at a constant speed, while the vehicle proceeds at any speed backward or forward, as desired.

Although I have referred to the power-transmission device as employed in an automobile, it is obvious that it is by no means limited to this use, since it can be employed to great advantage wherever it is desired to transmit motion from a driving-shaft to a driven shaft, the speed of one to be variably controlled relatively to the other.

What I claim is—

1. In a transmission mechanism, a driving-shaft, a shaft to be driven, an epicyclic train of spur-gears between the same, and means comprising a friction-disk with convex bearing-surface to stop or control the movement of said train-case.

2. In a transmission mechanism, a driving-shaft, a shaft to be driven, an epicyclic train of spur-gears between the same, suitable bearings for the train-case, and means coacting with the end face of the train-case for frictionally controlling the rotation of said case.

3. In a transmission mechanism, a driving-shaft, a shaft to be driven, an epicyclic train of spur-gears between the same, and means comprising a rotatable friction device to check or to control the movement of said train-case, said device being driven by the driving-shaft and pivotally mounted.

4. In a transmission mechanism, a driving-shaft, a shaft to be driven, an epicyclic train of spur-gears between the same, and means comprising a rotatable friction device to check or to control the movement of said train-case, said device being driven by the driving-shaft and pivotally mounted and normally bearing against said case.

5. In a transmission mechanism, a driving-shaft, a shaft to be driven, an epicyclic train of gears between the same, and means comprising a rotatable friction device to check or to control the movement of said train-case, bearings for said friction device, a support for said bearings, a spring, said support being held in its normal position by said spring, and means for directly disengaging said friction device from the train-case at any time.

6. In a transmission mechanism, a driving-shaft, a shaft to be driven, an epicyclic train of spur-gears between the same, and means comprising revoluble friction devices to control or check the movement of said train-case, said friction device being pivotally mounted, and means for varying the position of contact of the device with the train-case.

7. In a device for obtaining a rotary motion controllable in speed and direction from a rotary motion of a substantially constant speed, an epicyclic train of spur-gears, and a means for giving rotation to the train-arm, the said means being driven at a speed uniformly proportional at all times to that of the source of motion.

8. In a device for obtaining a rotary motion controllable in speed and direction from a rotary motion of a substantially constant speed, an epicyclic train of spur-gears, means comprising a rotatable friction device, and means for driving said friction device at a positive rate of speed from the source of motion.

9. In a device for obtaining a rotary motion controllable in speed and direction from a rotary motion of a substantially constant speed, an epicyclic train of spur-gears, a train-case, and means coacting with the end face of the train-case at varying radii for controlling the rotation of said case.

10. In a transmission mechanism, a driving-shaft, a shaft to be driven, an epicyclic train of gears between the same, a train-case, a tiltable friction device for controlling the rotation of said train-case and means for perpendicularly withdrawing the said friction device from contact with said train-case by one movement.

11. In a transmission mechanism, a driving-shaft, a shaft to be driven, an epicyclic train of spur-gears between the same, a train-case, suitable bearings for the train-case, means to control or check the movement of said train-case said means comprising a tilting friction device bearing against the end of said train-case and coacting therewith at varying radii.

12. In a transmission mechanism, a driving-shaft, a shaft to be driven, an epicyclic train of spur-gears between the same, a train-case revolubly mounted concentric with the driving-shaft and carrying spur-gears, rotatable means driven positively from the power-shaft and coacting with the train-case to stop or to control the speed of the same in either direction.

13. In a transmission mechanism, a driving-shaft, a shaft to be driven, an epicyclic train of spur-gears between the same, a train-case revolubly mounted concentric with the driving-shaft and carrying spur-gears, rotatable means driven from the power-shaft and coacting with the perpendicular end of the train-case to stop or to control the speed of the same in either direction.

14. In a transmission device, a driving-shaft, a shaft connected thereto by a train of spur-gears, a gear-case for said spur-gears and means for controlling the speed of the gear-case from the driving-shaft, said means comprising a friction device rotated at a uniform speed relatively to the driving-shaft and adapted to bear against the gear-case at varying radii and to transmit motion in either direction thereto.

15. In a transmission mechanism, a driving-shaft, a shaft to be driven, an epicyclic train of spur-gears between the same, a train-case and a suitable bearing therefor, a friction device rotated positively from the driving-shaft and tiltingly mounted and adapted to normally bear against the gear-case and to engage therewith at varying radii whereby the speed of the gear-case in either direction may be controlled.

16. In a transmission mechanism, a driving-shaft, a shaft to be driven, an epicyclic train of spur-gears between the same, a train-case and a suitable bearing therefor, a friction device rotated by the driving-shaft and tiltingly mounted and adapted to normally bear against the end of the gear-case and to engage therewith at varying radii whereby the speed of the gear-case in either direction may be controlled.

17. In a transmission mechanism, a driving-shaft, a shaft to be driven, an epicyclic train of spur-gears between the same, a train-case and a suitable bearing therefor, a friction device rotated by the driving-shaft and tiltingly mounted, said friction device having a convex bearing-face perpendicular to its axis of rotation adapted to normally bear against the gear-case and to engage therewith at varying radii whereby the speed of the gear-case in either direction may be controlled.

18. In a transmission mechanism, a driving-shaft, a shaft to be driven, an epicyclic train of spur-gears between the same, a train-case and a suitable bearing therefor, a friction device rotated by the driving-shaft and tiltingly mounted, said friction device having a convex bearing-face adapted to normally bear against the end of the gear-case and to engage therewith at varying radii whereby the speed of the gear-case in either direction may be controlled.

19. In a transmission mechanism, a driving-shaft, a shaft to be driven, an epicyclic train of gears including a plurality of sets of shifting trains connecting the driving-shaft and the driven shaft, a support for said shifting trains and means for allowing the driving-shaft to rotate independently of the driven shaft without disconnecting said gears, said means bearing against the end of said gear-support for variably controlling the planetary movement of said shifting train.

20. In a transmission device, a driving-shaft, a shaft connected thereto by a train of spur-gears, means for allowing the driving-shaft to rotate independently of said second shaft without disconnecting said gears, supporting means for said gears, said supporting means being revolubly mounted concentric with the axes of the driving-shaft and the driven shaft, a friction device suitably mounted to engage with and control the speed and direction of the supporting means for the gears, means for controlling said friction devices to normally hold said friction device in detachable engagement with said gear-supporting means, and means for disengaging said friction device by one movement, all of said parts being so arranged that a forward or rearward direction may be imparted to the gear-supporting means as desired.

21. In a transmission mechanism, a driving-shaft, a shaft to be driven, an epicyclic train of spur-gears including a plurality of shifting trains, said gears connecting said shafts at all times, a train-case supporting the shifting trains and revolubly mounted, a plurality of friction devices driven by the driving-shaft at a uniform speed relative thereto and controlling the speed of the train-case by bearing against the end face of the same at variable radii.

ARTHUR F. BARDWELL.

Witnesses:
R. C. MITCHELL,
A. S. ALLYN.